June 30, 1970 W. N. ROOS 3,517,689
BUTTERFLY VALVE

Filed Sept. 26, 1968 2 Sheets-Sheet 1

INVENTOR
WILLIAM N. ROOS
BY
ATTORNEYS

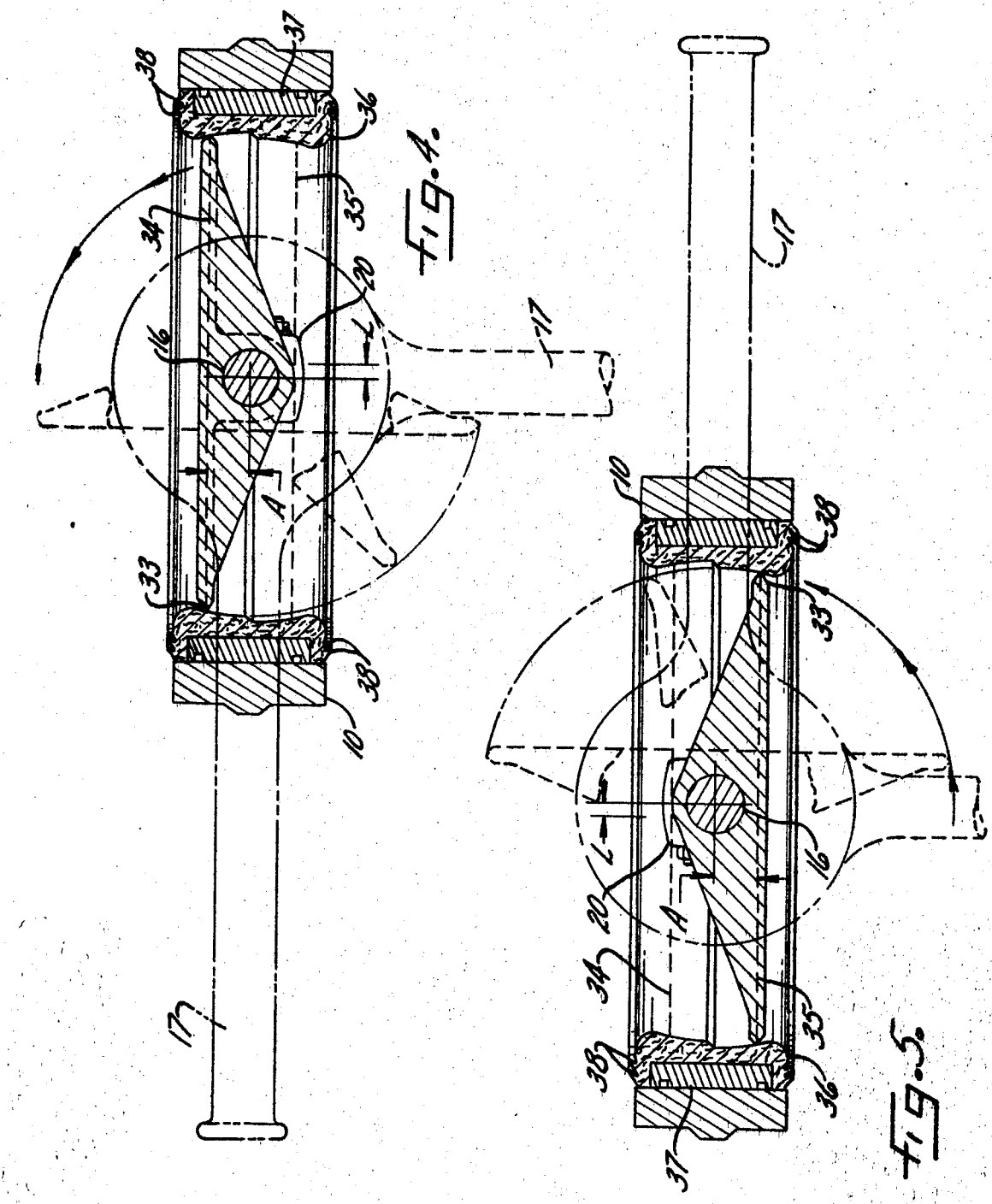

United States Patent Office 3,517,689
Patented June 30, 1970

3,517,689
BUTTERFLY VALVE
William N. Roos, St. Cloud, Minn., assignor to De Zurik Corporation, Sartell, Minn., a corporation of Minnesota
Filed Sept. 26, 1968, Ser. No. 762,781
Int. Cl. F16k 1/22
U.S. Cl. 137—329.01  3 Claims

ABSTRACT OF THE DISCLOSURE

A butterfly valve is described in which a pivoted valve disk may be shifted from sealing contact with a first seat to a second alternate seat by rotation through 180°. The valve seats and the pivot axis of the disk are offset laterally from the flow axis of the valve to eliminate scuffing of the alternate seat when not in use.

---

The present invention relates to disk or butterfly valves, and in particular to such a valve having alternate valve seats.

Although it is known to provide a second or alternate valve seat in a disk or butterfly valve, with the alternate seat being usable by rotating the disk through 180°, previous constructions have had the disadvantage that the alternate seat is worn and scuffed at substantially the same rate as the primary seat, even though not then in use. When the primary seat becomes too worn to seal properly the alternate seat is often worn the same or nearly as much, thus eliminating many of the advantages of such an alternate arrangement. Prior valves such as this are useful where the same valve must be used to control pressure occurring alternately from either side of the valve, but have little or no utility in extending the life of the valve through the provision of the additional seat.

The present invention has as its principal object the provision of an improved disk or butterfly valve in which the primary seat may be utilized in normal valve operation without the alternate seat becoming scuffed or worn. When the primary seat has been worn or damaged the disk may be simply rotated through 180° to bring the fresh alternate seat into use. The life of the valve is thereby effectively doubled.

Another object is to provide a valve of the above description in which bringing the alternate seat into use does not require disassembly of the valve, but may be achieved simply by forcibly turning the disk past its normal open position to a new sealing position 180° from the former sealing position.

These and other objects and advantages of the invention will become apparent upon reading the following description and upon reference to the drawings, in which:

FIG. 4 is an enlarged sectional plan view taken in the plane 4—4 of FIG. 1; showing one alternate sealing position; and FIG. 5 is a view similar to FIG. 4, showing a second alternate sealing position.

Figures 1, 2, 3:
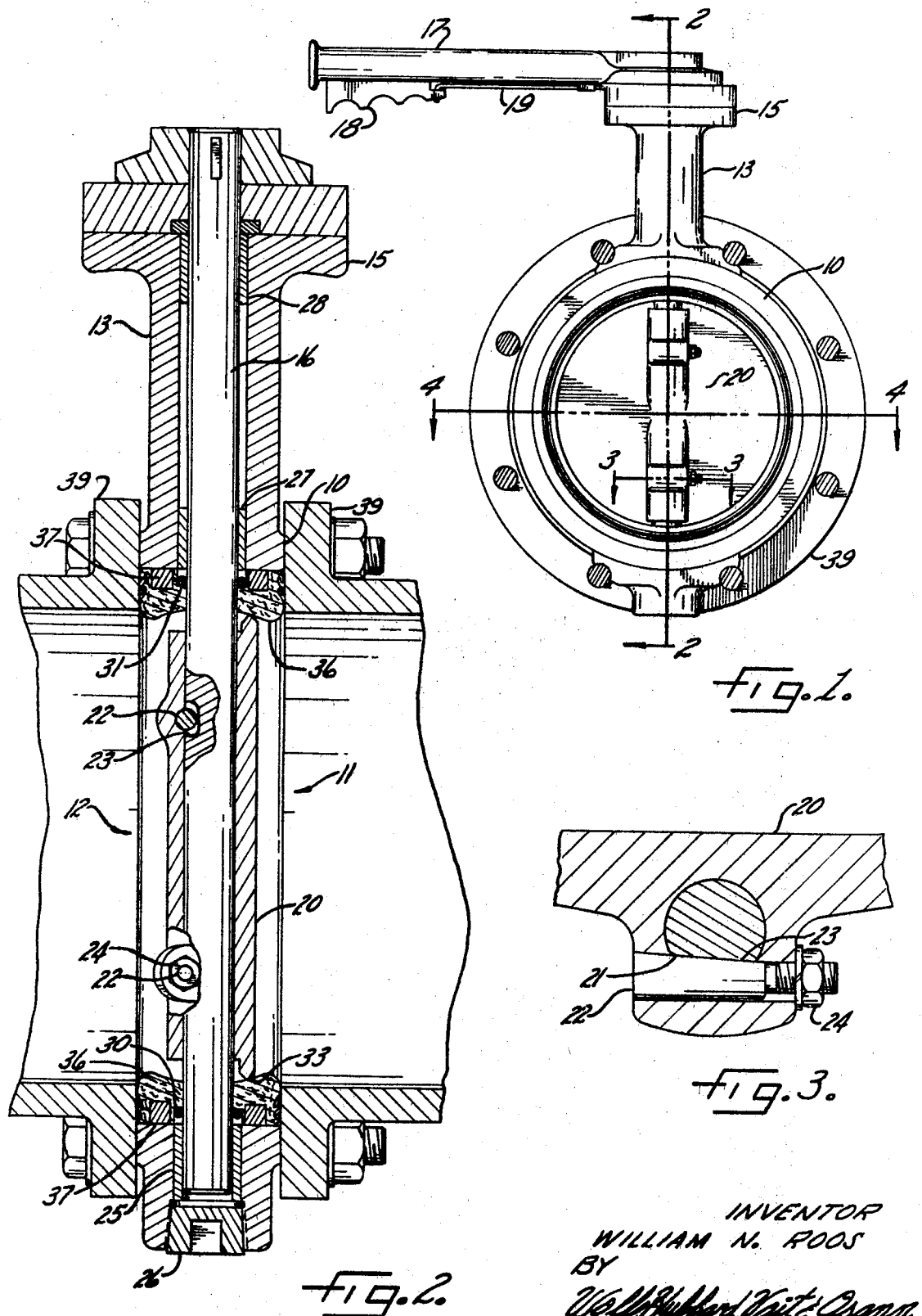
FIG. 1 is an end or axial elevation of a butterfly valve exemplifying the present invention, shown in the closed position.
FIG. 2 is an enlarged sectional side elevation taken in the plane 2—2 of FIG. 1.
FIG. 3 is an enlarged detail section taken in the plane 3—3 of FIG. 1.

The exemplary butterfly valve of the figures comprises a body 10 having an axial flow passage therethrough consisting of an inlet opening 11 and an outlet opening 12. Extending upwardly transverse to the central axis of the flow passage is a neck 13 terminating in a flange 15 through which the operating stem or shaft 16 of the valve passes. An operating handle 17 with a trigger 18 controlling a latching pin 19 is used to adjust the angular position of the shaft 16 and disc 20 with respect to the flow passage.

Within the valve is provided a circular valve disk 20 which is rigidly attached to flats 21 on the shaft 16 by pins 22, each of which has a flattened portion 23 and terminates in a threaded portion engaging a nut 24. The shaft 16 is carried in bearings at each end, with a lower bearing 25 being located in a bore at the bottom of the body which is closed by a plug 26 and two upper bearings 27, 28 being spaced within the neck 13 of the body 10. Leakage around the shaft 16 and through the neck 13 from the flow passage is prevented by O-ring seals 30, 31, located in suitable annular receptacles surrounding the shaft 16.

As a principal feature of the invention, the disk 20 is enabled to seat alternately in each of two separate sealing positions whereby one portion of the valve seat can be used until it becomes worn at which time the disk 20 is simply rotated 180° by means of the handle 17 to engage and seal in a second sealing position adjacent and spaced from the first. For this purpose the disk 20 is offset both axially and laterally from the shaft 16 on which it is pivoted. Referring particularly to FIGS. 4 and 5, it may be seen that the disk 20 is first offset axially from the centerline of the shaft 16 by a distance A, measured along the axis of the flow passage. The disk 20 is also offset laterally from the flow axis by a distance L from the shaft 16, with the latter distance being measured between a line bisecting the disk 20 in the vertical direction and the centerline of the shaft 16.

A peripheral sealing edge 33 of the disk 20 seats alternately against two different circular lines of peripheral sealing contact 34, 35 in a valve seat member 36 disposed circumferentially about the inner wall of the valve body 10 in a plane transverse to the flow axis. The seat 36 is preferably constructed of a resilient elastomeric substance such as synthetic rubber and is internally reinforced by a continuous reinforcement member 37. To accommodate the shaft 16, both the seat 36 and its reinforcement member 37 are provided with circular openings located 180° apart through which the shaft 16 is received.

Further in accordance with the invention, the valve seat 36 comprises two individual sealing portions, each incorporating a separate line of sealing contact 34, 35 with the outer periphery of the valve disk 20. These portions are themselves laterally offset relative to one another so that one line of contact 34 is shifted laterally, that is, tranverse of the central axis of the flow passage, with respect to the other line of contact 35. By providing this lateral offset the valve disk 20, which is itself offset with respect to its shaft 16, is enabled to make accurate sealing contact with both position of sealing contact 34, 35 by rotation through 180°. It the lateral offset of the disk 20 relative to the shaft 16 is a distance L, then the lateral offset of one line of sealing contact 34 relative to the other 35 is a distance 2L. Stated another way, the offset of the disk 20 relative to its pivot shaft 16 is one-half of the relative offset of the two lines of intended sealing contact 34, 35.

In the same way, the lines of sealing contact 34, 35 are disposed in parallel planes transverse to the central axis of the valve body 10, and spaced axially by a distance of twice the axial offset of the valve disk 20 with respect to the centerline of its pivot shaft 16. If the offset of the disk 20 from its shaft 16 is a distance A, then the axial spacing between the lines of sealing contact 34, 35 is a distance 2A.

In cross-section as seen in FIGS. 4 and 5, the seat 36 is seen to have a plurality of annular grooves or serrations 38 on each side face in a plane in line with and parallel to the inlet and outlet openings 11, 12, respectively. Individual grooves 38 are formed circumferentially around the side faces of the seat 36 where it contacts the abutting face of a pipe flange 39 on each side. By clamping the valve body 10 tightly between a pair of opposing inlet and outlet flanges 39, the grooves 38 are slightly compressed (FIG. 2) and, upon the application of internal pressure, flex outward against the mating pipe flanges 39 to tightly seal the valve joint against leakage.

In normal operation, it may be assumed that the valve disk 20 is first used in conjunction with the first line of sealing contact 34 on the valve seat 36. In this position, the handle 17 is turned 90° from the sealed position (FIG. 4) in order to turn the disk 20 parallel to the direction of flow, thus defining the fully opened condition. In so opening, the lateral offset of the valve disk 20 insures that the unused line of sealing contact 35 is cleared by the periphery 33 of the disk without rubbing or scuffing which would in any way impair the surface of that portion of the valve seat 36 for later use. When the first line of sealing contact 34 on the seat 36 becomes damaged or too worn for further use, the disk 20 is positioned in a new sealing position 180° from the previous one (FIG. 5). The valve can also be removed from the line and reversed, if desired, so that the disk 20 is again presented in the same position relative to the direction of flow. The new line of sealing contact 35 is then utilized, with the previous line of contact 34 being again cleared by the disk 20 without rubbing due to the lateral offsets provided.

In the illustrated exemplary embodiment of the invention, each of the lines of sealing contact 34, 35 in the valve seat 36 is desirably a segment of the spherical surface formed as a surface of revolution by rotation of the circular outer periphery 33 of the valve disk 20. It will be appreciated that the invention is subject to various modifications and alternative embodiments and thus need not be so limited, and that a section of a like spherical surface could be formed instead by the outer periphery 33 of the valve disk 20 with the lines of sealing contact 34, 35 being upraised ridges or a circumferential internal rib (not shown) on the seat 36. In either case, the lateral offsets of the valve disk 20 and of the lines of sealing contact 34, 35 are effective to eliminate wear on each of the two alternate lines of sealing contact 34, 35 when the other is in use.

Unless the disk 20 can be disassembled from its shaft 16, turned around, and replaced in its alternate position, it will not clear the other seat upon reaching its new location. This is because one side of the valve disk 20 is offset from the centerline of the shaft 16 and therefore will interfere with the portion of the valve seat 36 previously used to engage and seal against the opposite edge of the disk. However, the resilient valve seat 36 used pursuant to the present invention allows this to be done by simply turning the handle 17 180° from one closed position to the next in order to deflect and ride over a portion of the valve seat area previously used in order to reach the alternate valve seat area.

The following is claimed as invention:

1. A butterfly valve comprising, in combination,
   a body having an axial flow passage disposed therethrough,
   a valve disc having a peripheral sealing surface disposed in a plane perpendicular to the flow passage when the valve disc is in closed position and having means for rotation about a transverse pivot axis, the plane of said sealing surface being axially offset along the flow passage from the pivot axis and the center of the disc also being laterally offset from the flow axis and from the disc pivot axis when the valve disc is in said closed position, and
   a valve seat having first and second regions of annular sealing contact cooperating with the peripheral valve disc sealing surface and perpendicular to the flow passage, said regions being parallel and axially spaced by a distance of twice said axial disc offset and being laterally offset by a distance of twice said lateral disc offset.

2. A butterfly valve as defined in claim 1 in which said seat is made of resilient material, whereby the valve disk may be rotated 180° to ride over one of said regions to achieve sealing engagement with the other of said regions.

3. A butterfly valve as defined in claim 1 in which each of said regions is substantially a spherical surface of revolution defined by the rotation of said disk.

References Cited

UNITED STATES PATENTS

| 2,740,423 | 4/1956 | Stillwagon | 251—306 X |
| 3,290,001 | 12/1966 | Taylor | 251—306 X |
| 3,343,805 | 9/1967 | Felton | 251—306 |

M. CARY NELSON, Primary Examiner

R. B. ROTHMAN, Assistant Examiner

U.S. Cl. X.R.

251—306